United States Patent [19]

Kusumoto et al.

[11] Patent Number: 5,251,039
[45] Date of Patent: Oct. 5, 1993

[54] SYSTEM FOR RECIPROCATING OPTICAL UNITS OF DIFFERENT SPEEDS IN OPPOSITE DIRECTIONS BY USE OF TWO MOTORS

[75] Inventors: Hiroshi Kusumoto, Wakayama; Hideki Ishida, Yao, both of Japan

[73] Assignee: Mita Industrial Co., Ltd., Osaka, Japan

[21] Appl. No.: 824,175

[22] Filed: Jan. 22, 1992

[30] Foreign Application Priority Data

Feb. 4, 1991 [JP] Japan .................................. 3-035720

[51] Int. Cl.⁵ ........................ H04N 1/036; H04N 1/04; B41J 19/30
[52] U.S. Cl. ................................ 358/296; 358/497; 400/322; 400/903
[58] Field of Search ............. 358/296, 494, 497; 346/139 R, 139 A; 250/208.1; 400/317, 322, 903

[56] References Cited

U.S. PATENT DOCUMENTS

| | | | |
|---|---|---|---|
| 4,203,679 | 5/1980 | Duerr et al. | 400/322 X |
| 4,731,657 | 3/1988 | Miyagi | 358/497 |
| 4,748,514 | 5/1988 | Bell | 358/497 X |
| 5,075,539 | 12/1991 | Shiraishi | 358/497 X |

Primary Examiner—Benjamin R. Fuller
Assistant Examiner—Eric Frahm
Attorney, Agent, or Firm—Wenderoth, Lind & Ponack

[57] ABSTRACT

A device for driving optical units for scanning manuscript and provides that movement of the optical units during scanning is achieved by a first pulse motor exhibiting low-noise and high-torque characteristics within a motor speed range suitable for achieving a desired scanning travel speed. Return movement of the optical units is achieved by a second pulse motor exhibiting low-noise and high-torque characteristics within revolving a motor speed range suitable for achieving a higher desired return travel speed. Not only are the optical units moved in both directions, but also noise generated during such movement is reduced as much as possible.

3 Claims, 4 Drawing Sheets

SYSTEM FOR RECIPROCATING OPTICAL UNITS OF DIFFERENT SPEEDS IN OPPOSITE DIRECTIONS BY USE OF TWO MOTORS

BACKGROUND OF THE INVENTION

1. Field of the Invention

The present invention relates to a device for driving in a reciprocating manner an optical unit used in a copying machine, a manuscript reading apparatus or the like.

2. Description of the Prior Art

In a copying machine, a manuscript reading apparatus or the like, wherein a slit exposure operation is carried out, an optical unit having a light source for illuminating a manuscript is reciprocated to scanningly illuminate the manuscript supported on a transparent manuscript carrying plate and to guide light reflected by the manuscript to a photoreceptor, such as a sensitive member or CCD, through a lens device.

Such optical unit is accelerated from an appointed position called a starting or home position and then is moved at a constant speed in order to scan the manuscript. The unit then is braked and stopped after completion of scanning of the manuscript (scanning movement or travel). The optical unit then is accelerated in a direction opposite to the direction of scanning travel, and then is braked when returned to the starting or home position after the completion of such accelerated travel (return movement or travel).

However, it is necessary during scanning travel that the speed of the unit does not fluctuate within a range of travel during which the manuscript is scanned. In addition, it is necessary during return travel that such movement is conducted speedily in order to minimize operator waiting time. In the past, a single pulse motor has been used as a driving source to achieve this reciprocating movement. This single pulse motor has been operated to rotate in opposite directions and to achieve both constant speed travel or accelerated travel in both directions. However, when scanning travel and return travel are carried out by a single pulse motor, a difference exists between the speed of scanning travel and the speed of return travel. If characteristics of the pulse motor are set to avoid noise during return travel, then noise is increased during scanning travel, then noise is increased during scanning travel. Also, if characteristics of the pulse motor are set to avoid noise during scanning travel, then noise is increased during return travel.

SUMMARY OF THE INVENTION

The present invention has been developed in view of the above described circumstances, and it is an object of the present invention to provide a device for driving in a reciprocating manner an optical unit and capable not only of carrying out desired travel in both a scanning travel direction and a return travel direction, but also of reducing generated noise as much as possible in both such scanning travel and return travel directions.

In order to achieve the above described object, a system for driving in a reciprocating manner an optical system including a first optical unit and a second optical unit for scanning a manuscript moves both units in the same direction at a constant speed during scanning travel for scanning the manuscript, so that the first unit is moved at a speed twice that of the second unit, and moves both units during return travel at a speed higher than that during scanning travel. According to the invention, the driving system for the optical includes a first pulse motor exhibiting low-noise and high-torque characteristics within a first motor speed range during scanning travel is used for scanning travel of both optical units, and a second pulse motor exhibiting low-noise and high-torque characteristics within a higher second motor speed range during return travel is used for return travel of both optical units.

According to the above described construction, during scanning travel of the optical units they are driven by means of the first pulse motor exhibiting low-noise and high-torque characteristics within the motor speed range necessary to achieve a desired scanning travel speed, while during return travel of the optical units they are driven by means of the second pulse motor exhibiting low-noise and high-torque characteristics within the motor speed range necessary to achieve a desired return travel speed. Accordingly, the optical units can be moved stably during travel in both the scanning and return directions. Also, since the first pulse motor and the second pulse motor both generate low noise within the respective motor speed ranges while achieving desired high torque thereat, generation of noise is reduced during both directions of travel. Thus, a quiet copying operation can be achieved in a high speed machine.

Consequently, according to the present invention, the desired travel can be achieved in both the scanning travel and the return travel directions, and the generation of noise can be reduced during such travel operations. Therefore, a copying or like operation can be carried out without generating discomfort to those in the area.

DESCRIPTION OF THE PREFERRED EMBODIMENT

The preferred embodiment of the present invention will be described with reference to the drawings.

Figure 2:
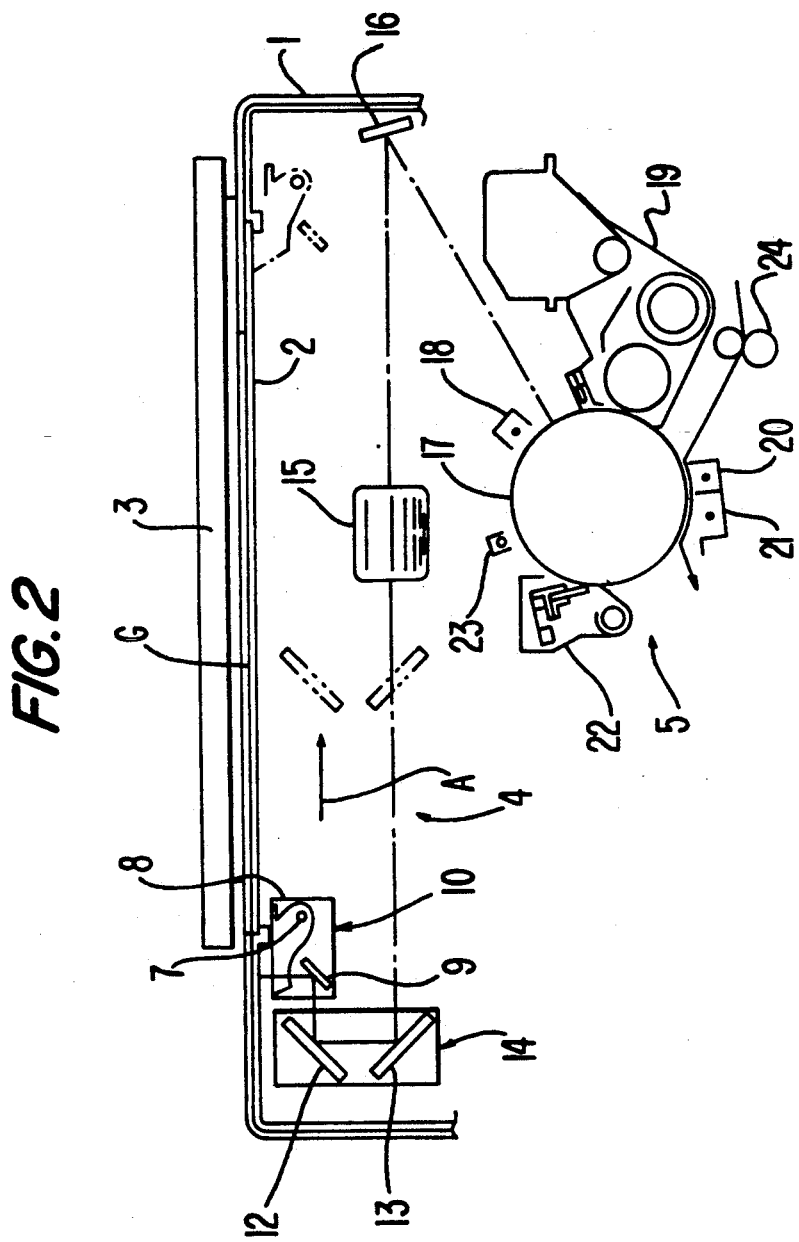
FIG. 2 is a schematic view showing principal parts of a copying machine having incorporated therein such device for driving optical units.

FIG. 2 schematically shows a copying machine to which the present invention is applied. Referring to FIG. 2, reference numeral 1 designates a body of the copying machine, body 1 being provided with a transparent manuscript carrying plate 2 and a manuscript weight 3 thereabove, an optical system 4 in an upper portion of an interior thereof and a copying treatment system 5 in a lower portion of such interior thereof.

Figure 1:
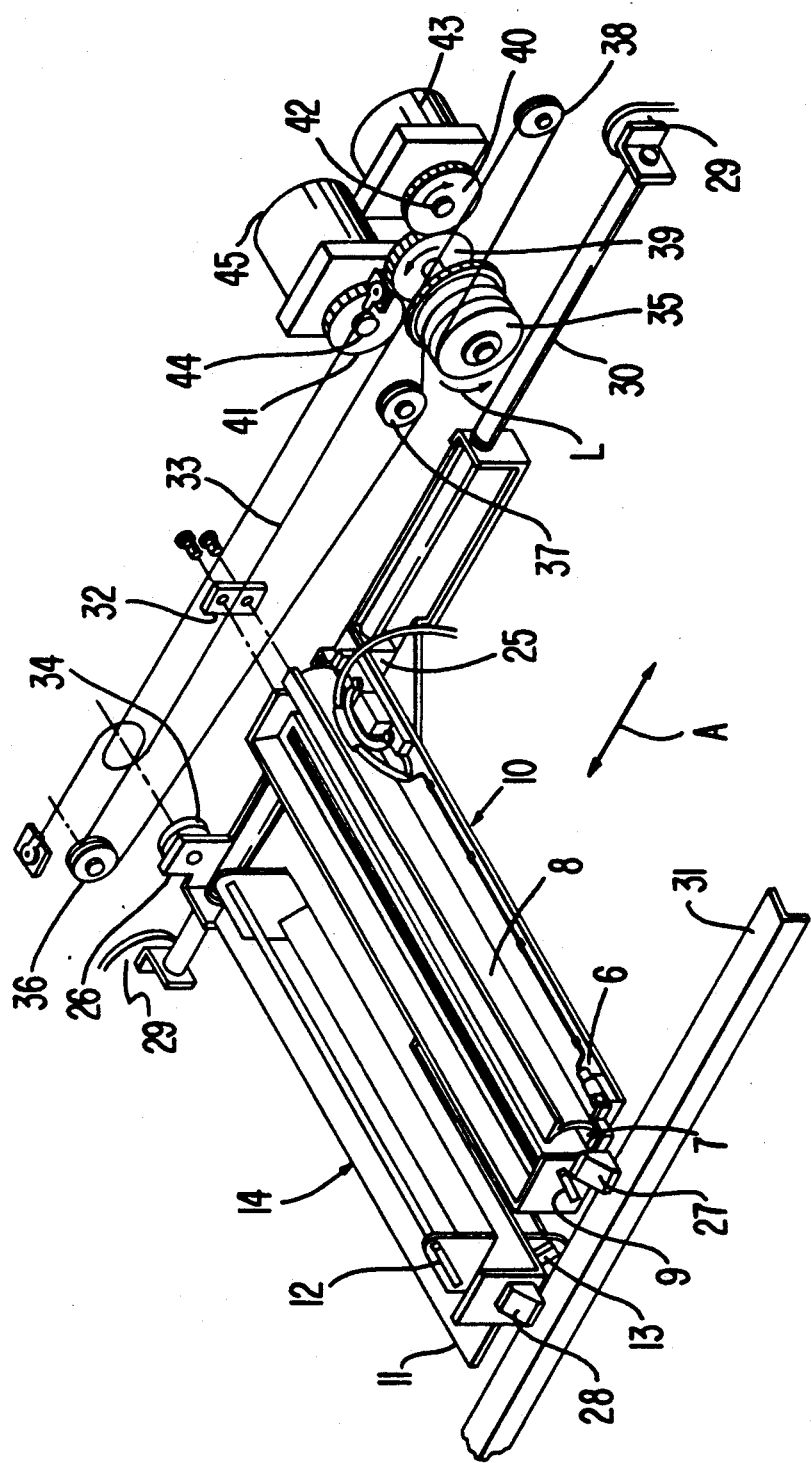
FIG. 1 is a perspective view showing one example of a device for driving optical units according to the present invention.

Optical system 4, as shown also in FIG. 1, is composed of a first optical unit 10 comprising a light source 7 for illuminating a lower surface of a manuscript (G) carried on manuscript carrying plate 2, a reflector 8 and a first mirror 9 reflecting light reflected from a manuscript surface. Unit 10 is carried on a carriage 6. System 4 also includes a second optical unit 14 comprising a second mirror 12 and a third mirror 13 reflecting light reflected from first mirror 9. Unit 14 is carried on a carriage other than carriage 6. System 4 further includes a lens device 15 through which passes light from third mirror 13 and a fourth mirror 16 reflecting light passing through lens device 15 toward a sensitive member 17 which is a photoreceptor.

The manuscript (G) carried on the manuscript carrying plate 2 can be illuminatingly scanned, and light reflected from the manuscript can be guided onto sensitive member 17 through the mirror 9, the mirror 12, the mirror 13, the lens device 15 and the mirror 16. This is done by moving first optical unit 10 at an appointed constant speed in a direction shown by an arrow (A) in FIG. 2 and at the same time moving second optical unit 14 at a speed equal to one-half the speed of movement of the first optical unit 10 in the same direction as the first optical unit 10. In addition, the first optical unit 10 and the second optical unit 14 are adapted to be able to reciprocate between starting or home positions (left end positions shown by solid lines in FIG. 2) and maximum illuminating and scanning or finishing position (right end positions shown by dashed lines in FIG. 2).

Copying treatment system 5 comprises a charging device 18, a developing device 19, a transfer device 20, a paper separating device 21, a cleaning device 22 and a discharging device 23 arranged in the order described around the sensitive member 17 revolving in one direction. Light reflected from the manuscript (G) is incident upon a surface of the sensitive member 17 uniformly charged by means of charging device 18 to form an electrostatic latent image that is converted into a toner image by means of developing device 19. Such toner image is transferred onto paper sheets supplied by rollers 24 in an appointed timing by means of transfer device 20. The paper sheets are separated from the surface of the sensitive device 17 by means of paper separating device 21. Toner remaining on the surface of the sensitive member 17 after the completion of the transfer operation is recovered by means of cleaning device 22, and any charge remaining on the surface of member 17 is erased by means of discharging device 23.

A structure for reciprocating the first optical unit 10 and the second optical 14 now will be described with reference to FIG. 1. Carriage 6 of the first optical unit 10 and carriage 11 of the second optical unit 14 are supported on a slide rod 30 and on a slide rail 31, that in turn are supported on a fitting base plate 29, by respective metal slide fittings 25, 26 and by respective slide members 27, 28, so as to be moved therealong in opposite directions while being maintained in a parallel alignment to each other.

One end of carriage 6 is fixedly mounted midway of a driving cable or wire 33 by means of a fixing metal fitting 32, while an adjacent end of the carriage 11 has thereon a movable pulley 34 on which is mounted driving wire 33. The driving wire 33 is fixed at opposite ends thereof and passes around a driving pulley 35 and a stationary pulley 36, a tension pulley 37 and a stationary pulley 38 installed on body 1 of the copying machine. Driving wire 33 from one fixed end thereof extends around movable pulley 34, stationary pulley 36 and tension pulley 37 and is wound around driving pulley 35, and then extends around stationary pulley 38 and movable pulley 34 again to the other fixed end. Such construction ensures that, during movement of the optical units, unit 10 will move at a speed twice that of unit 14.

The driving pulley 35 is integral with a gear wheel 39 and is rotatable therewith by gear wheels 40, 41 engaged with gear wheel 39. A first pulse motor 43 is connected with gear wheel 40 through an output shaft 42, while a second pulse motor 45 is connected with gear wheel 41 through an output shaft 44. First pulse motor 43 is used to cause movement of first optical unit 10 and second optical unit 14 in the direction shown by arrow (A) in order to scan the manuscript, while second pulse motor 45 is used to cause movement of optical units 10, 14 in a direction opposite to the direction shown by the arrow (A).

Figure 3:
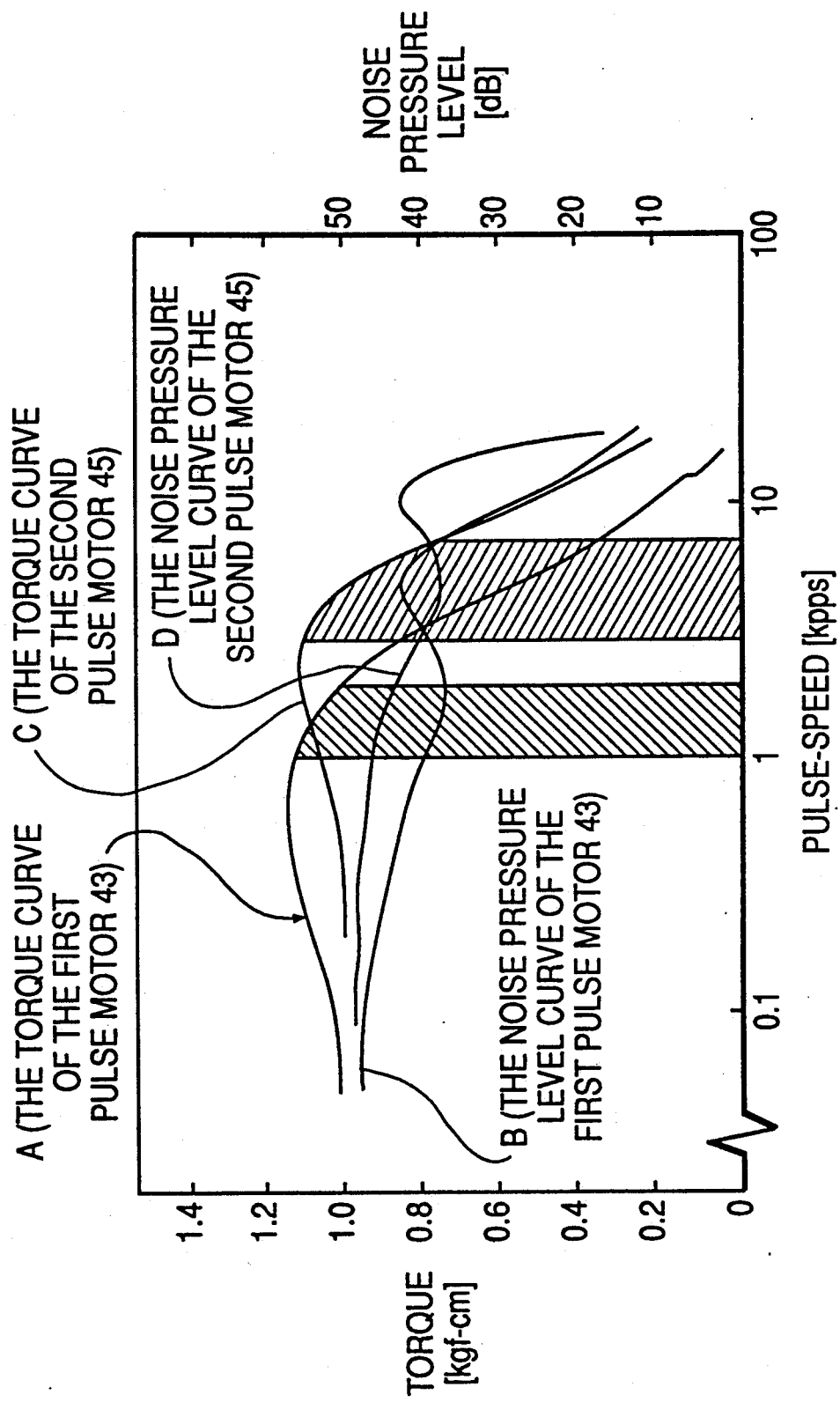
FIG. 3 is a graph showing relationships among pulse speeds, torques and noise levels.

A pulse motor exhibiting low-noise and high-torque characteristics, which gives a torque of 1.0 kgf-cm or more (refer to curve A in FIG. 3) but generates a noise level of merely 40 dB or less (refer to curve B in FIG. 3) within a motor speed range necessary to achieve a scanning travel speed for scanning the manuscript, for example at a pulse motor speed (revolving speed) of output shaft 42 of 1.5 kpps, is used as the first pulse motor 43. In addition, a pulse motor exhibiting low-noise and high-torque characteristics, which gives a torque of 1.0 kgf-cm or more (refer to curve C in FIG. 3) but generates a noise level of merely 43 dB or less (refer to curve D in FIG. 3) within a motor speed range necessary to achieve a return travel speed and higher than the motor speed range for scanning movement speed, for example at a pulse motor speed of output shaft 44 of 4.5 kpps, is used as the second pulse motor 45.

Figure 4:
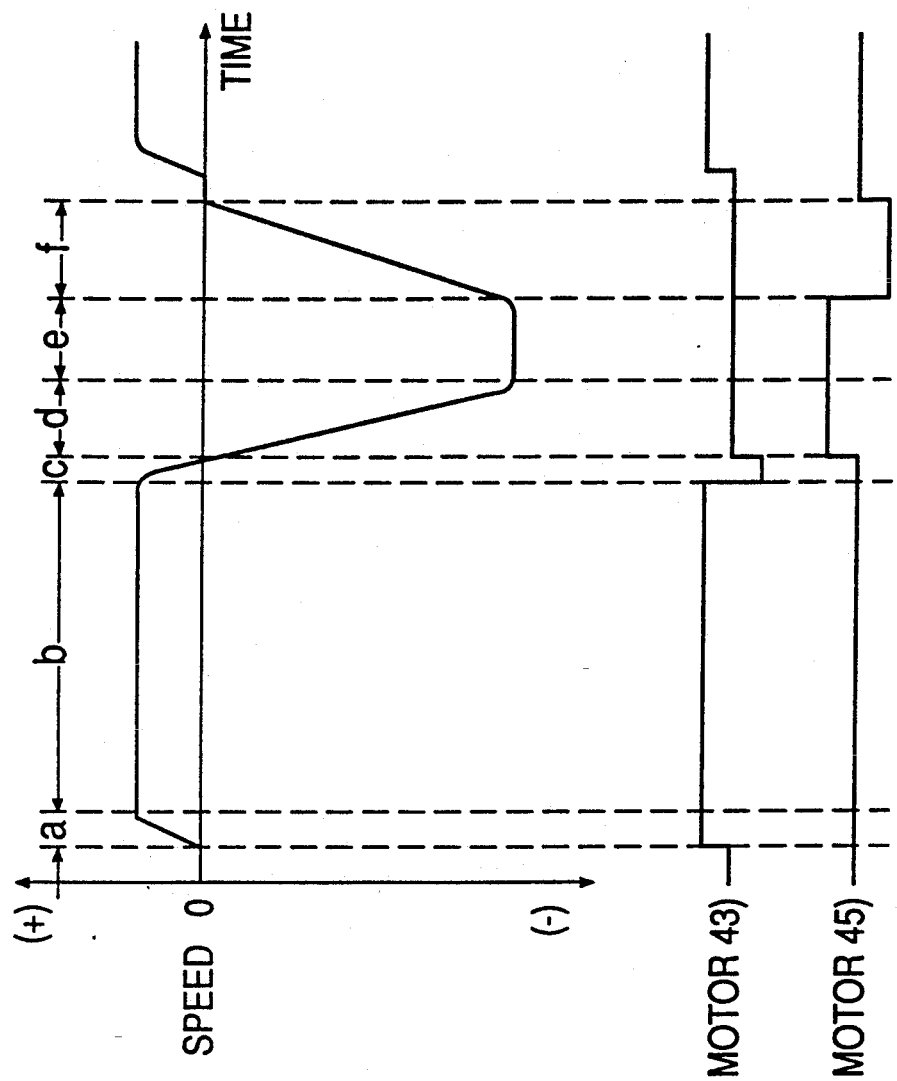
FIG. 4 is a diagram illustrating operation of pulse motors used in the present invention.

Movements of the system for reciprocating the optical units and having the above described construction will be described with reference to FIG. 4. Upon starting a copying operation by pushing a print key (not shown), light source 7 is lighted and at the same time the first pulse motor 43 is driven to revolve the gear wheel 40 in the direction shown by the arrow in FIG. 1, thereby driving the gear wheel 39 and the driving pulley 35 in a direction shown by arrow (L) in FIG. 1. As soon as the driving pulley 35 is revolved in such direction, both optical units 10, 14 are moved in the direction shown by the arrow (A) to achieve scanning movement or travel. In this case, both optical units 10, 14 are accelerated, as shown by a range (a) in FIG. 4, in a first stage of such travel and then are moved at a constant speed necessary for scanning the manuscript, as shown by a range (b). Subsequently, the first pulse motor 43 is braked at a position close to the maximum manuscript scanning or finishing position, as shown by a range (c), and the light source 7 is shut off. The first pulse motor 43 is switched off, thus completing the scanning movement. The second pulse motor 45 then is driven to revolve the gear wheel 41 in a direction opposite to the direction shown by the arrow in FIG. 1, thereby revolving the gear wheel 39 and the driving pulley 35 in a direction opposite to the direction shown by arrow (L). Thus, optical units 10, 14 are moved in a direction opposite to the direction shown by arrow (A) to carry out return travel. In this case, both optical units 10, 14 are accelerated, as shown by a range (d) in FIG. 4, in a first stage of the return travel, and then are moved at a constant speed that is faster than the speed of movement during scanning travel, as shown by a range (e). Subsequently, the second pulse motor 45 is braked at a position close to the starting or home position, as shown by a range (f). When the units are returned to the home position, motor 45 is switched off, thus completing one cycle of operation. The machine then is stopped, or a new manuscript cycle is commenced.

What is claimed is:

1. In a system including first and second optical units movable together for reciprocating movement in a scanning first direction to scan a manuscript and in an opposite return second direction, relative speed maintaining means, operatively coupled to said first and second optical units, for ensuring that said first optical unit moves at a speed twice that of said second optical unit during movement of said optical units in both said first direction and second direction, and means for driving said optical units at higher respective speeds in said second direction than in said first direction, the improvement wherein said driving means is of a construction for ensuring high torque and low noise operation thereof during movement of said optical units in both said first direction and second direction and wherein said driving means comprises:

a first pulse motor, operatively coupled to said speed maintaining means, for imparting therethrough force for driving said optical units in said first direction at respective first speeds, said first pulse motor being operable at a first motor speed range suitable for achieving said driving of said optical units at said respective first speeds and at a first motor speed within said first motor speed range to rotate an output shaft of said first pulse motor at 1.15 kpps, and at said first motor speed generates a torque of at least 1.0 kgf-cm and generates a noise level of no more than 40 dB; and a second pulse motor, separate from said first pulse motor and operatively coupled to said speed maintaining means, for imparting therethrough force for driving said optical units in said second direction at respective second speeds greater than said respective first speeds, said second pulse motor being operable at a second motor speed range, greater than said first motor speed range, suitable for achieving said driving of said optical units at said respective second speeds and at a second motor speed within said second motor speed range to rotate an output shaft of said second pulse motor at 4.5 kpps, and at said second motor speed generates a torque of at least 1.0 kgf-cm and generates a noise level of no more than 43 dB.

2. A system as claimed in claim 1, wherein said optical units include respective carriages, and further comprising means for maintaining said carriages of said optical units in parallel orientation during movement thereof.

3. A system as claimed in claim 2, wherein said orientation maintaining means comprises a slide rod and a slide rail extending parallel to each other in said directions, each said carriage having at a first end thereof a slide fitting supported for sliding movement on said slide rod and having at a second end thereof a slide member supported for sliding movement on said slide rail.

* * * * *